United States Patent
Endo et al.

(10) Patent No.: US 12,118,801 B2
(45) Date of Patent: Oct. 15, 2024

(54) OBJECT RECOGNITION DEVICE

(71) Applicant: HITACHI ASTEMO, LTD., Hitachinaka (JP)

(72) Inventors: Takeshi Endo, Tokyo (JP); Haruki Matono, Tokyo (JP); Takeshi Nagasaki, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 374 days.

(21) Appl. No.: 17/767,043

(22) PCT Filed: Sep. 8, 2020

(86) PCT No.: PCT/JP2020/033885
§ 371 (c)(1),
(2) Date: Apr. 6, 2022

(87) PCT Pub. No.: WO2021/070537
PCT Pub. Date: Apr. 15, 2021

(65) Prior Publication Data
US 2022/0366700 A1 Nov. 17, 2022

(30) Foreign Application Priority Data
Oct. 8, 2019 (JP) .................................. 2019-185036

(51) Int. Cl.
*G06V 20/58* (2022.01)
*G06T 7/55* (2017.01)
(Continued)

(52) U.S. Cl.
CPC ............... *G06V 20/58* (2022.01); *G06T 7/55* (2017.01); *G06V 10/255* (2022.01);
(Continued)

(58) Field of Classification Search
None
See application file for complete search history.

(56) References Cited

U.S. PATENT DOCUMENTS

2018/0281757 A1 10/2018 Matsuo et al.

FOREIGN PATENT DOCUMENTS

| EP | 2 921 992 A2 | 9/2015 |
| JP | 2009-085651 A | 4/2009 |

(Continued)

OTHER PUBLICATIONS

International Search Report with English translation and Written Opinion issued in corresponding application No. PCT/JP2020/033885 dated Nov. 24, 2020.

*Primary Examiner* — Lennin R Rodriguezgonzalez
(74) *Attorney, Agent, or Firm* — Foley & Lardner LLP

(57) ABSTRACT

Provided is an object recognition device capable of accurately estimating a distance from an own vehicle to an object such as a pedestrian. There are provided: a part specification unit 104 that determines a specific part region in an object by analyzing an image of a region corresponding to the object detected by an overlapping region object detection unit 103; an image information storage unit 105 that stores image information on the part region determined by the part specification unit 104; a three-dimensional information acquisition unit 106 that acquires three-dimensional information of the part region specified by the part specification unit 104 on the basis of the distance information acquired by a distance information acquisition unit 102; a non-overlapping region object detection unit 107 that detects the part region specified by the part specification unit 104 with reference to the image information stored in the image information storage unit 105 for the non-overlapping region; and a distance calculation unit 108 that calculates a distance to an object including the part region on the basis of the (Continued)

detection region information on an image of the part region detected by the non-overlapping region object detection unit 107 and the three-dimensional information acquired by the three-dimensional information acquisition unit 106.

7 Claims, 20 Drawing Sheets

(51) Int. Cl.
*G06V 10/20* (2022.01)
*G06V 10/26* (2022.01)
*G06V 20/56* (2022.01)
*G06V 20/64* (2022.01)
*G08G 1/16* (2006.01)

(52) U.S. Cl.
CPC .......... *G06V 10/267* (2022.01); *G06V 20/588* (2022.01); *G06V 20/64* (2022.01); *G08G 1/166* (2013.01); *G06T 2207/10016* (2013.01); *G06T 2207/30252* (2013.01)

(56) References Cited

FOREIGN PATENT DOCUMENTS

| | | |
|---|---|---|
| JP | 2011-065338 A | 3/2011 |
| JP | 2015-195018 A | 11/2015 |
| JP | 2015-231179 A | 12/2015 |
| WO | WO-2017/090410 A1 | 6/2017 |

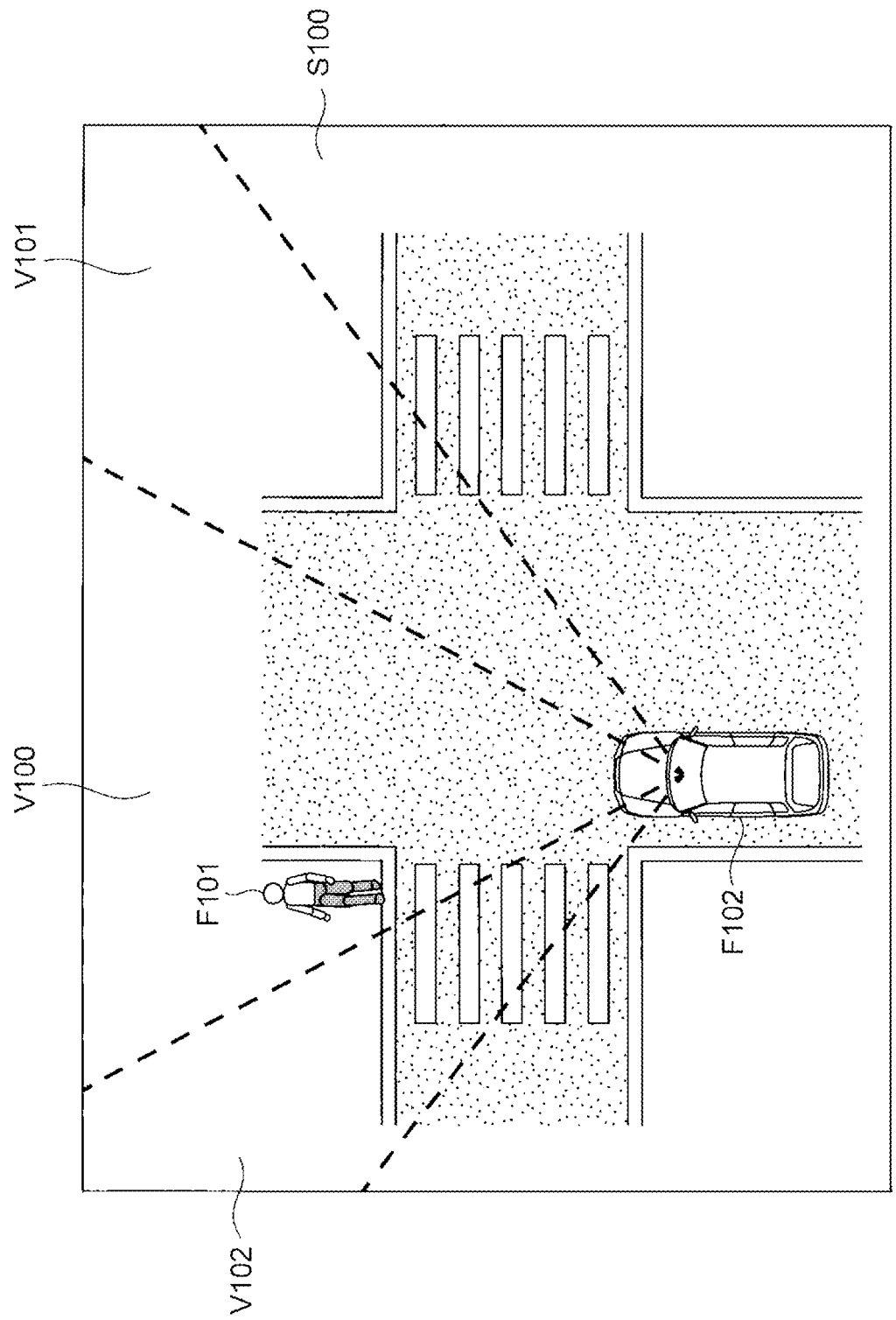

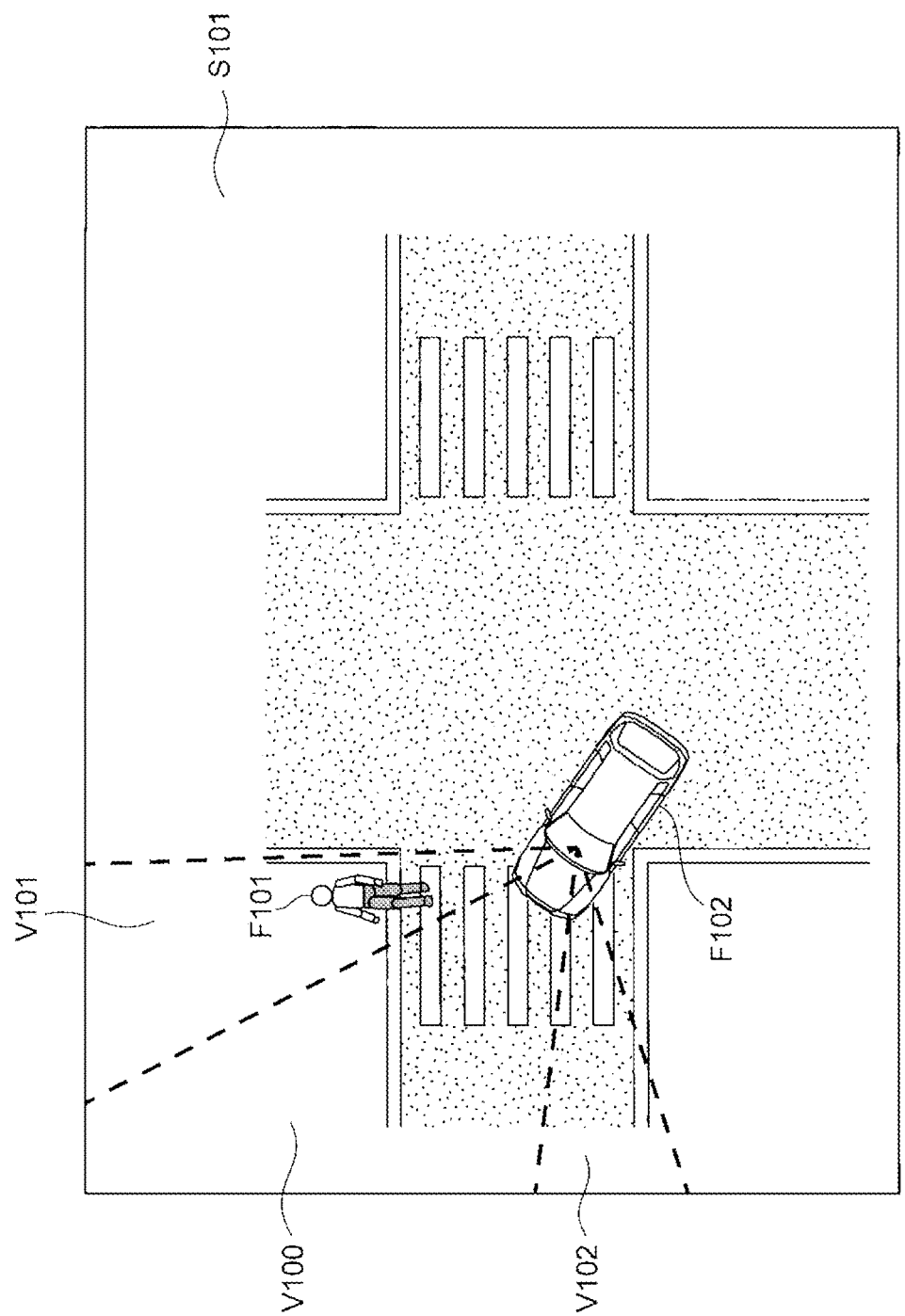

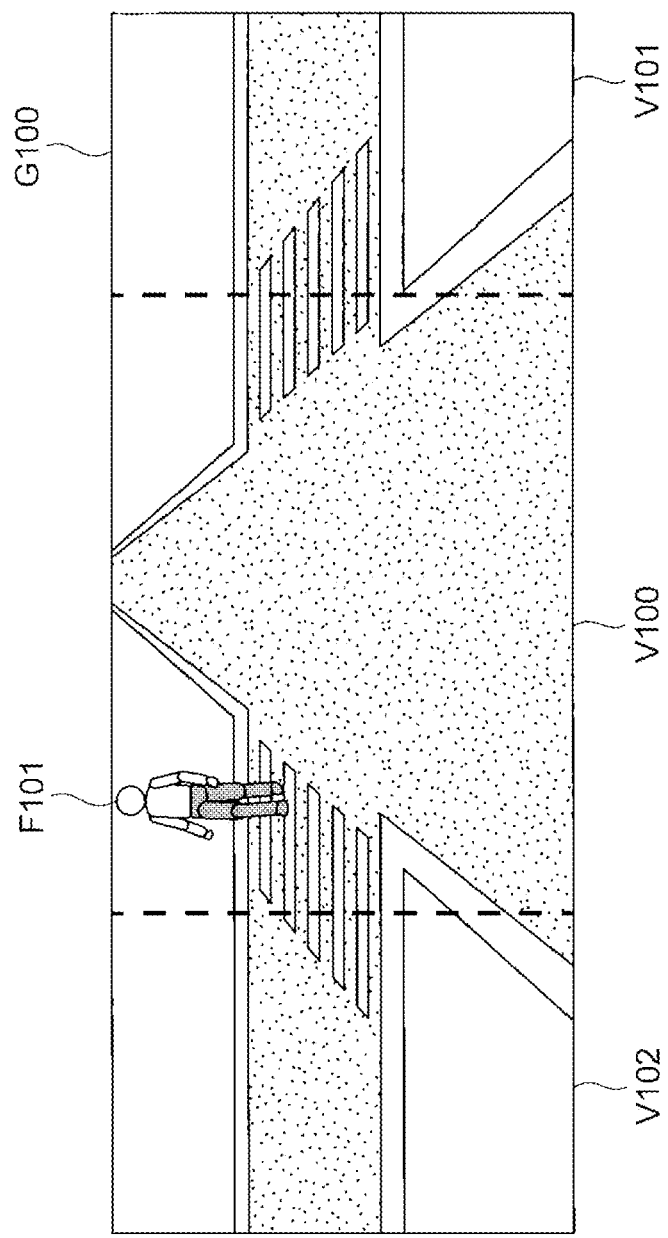

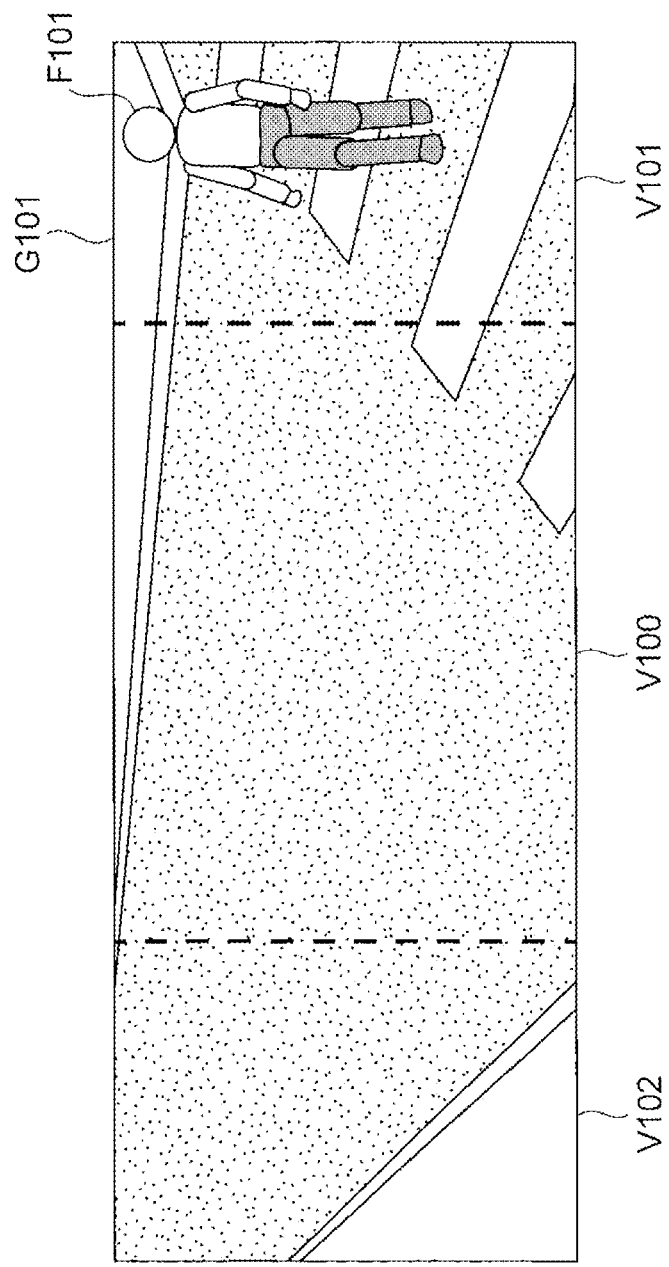

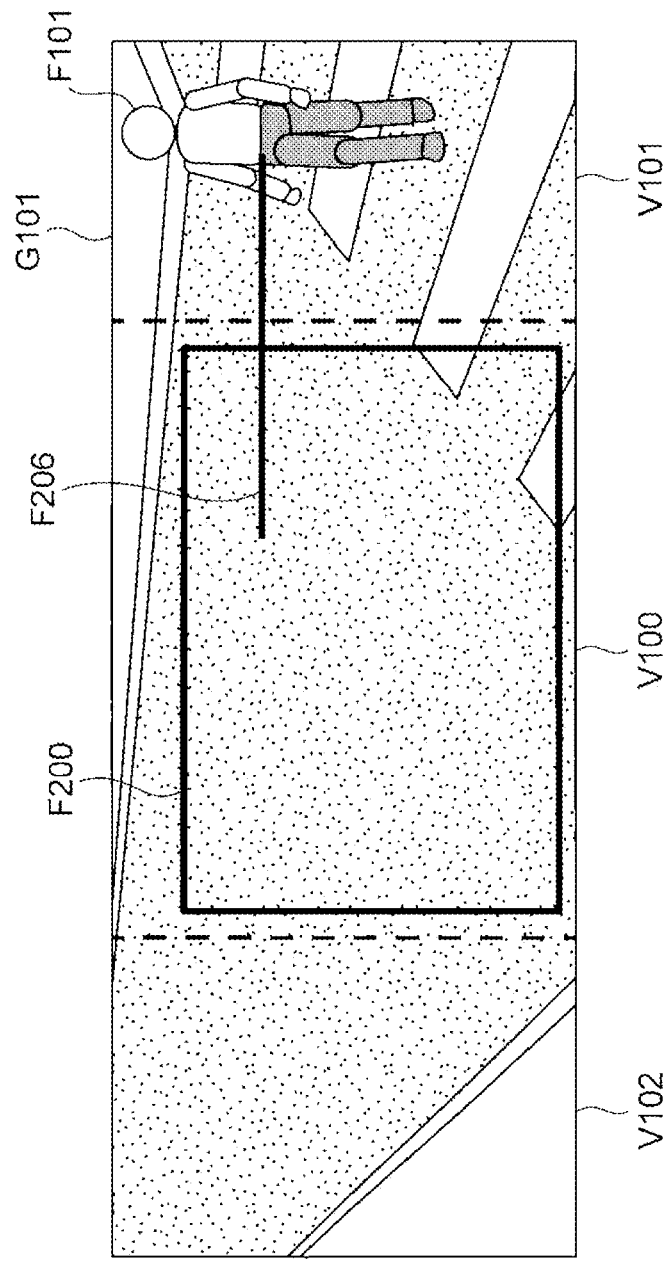

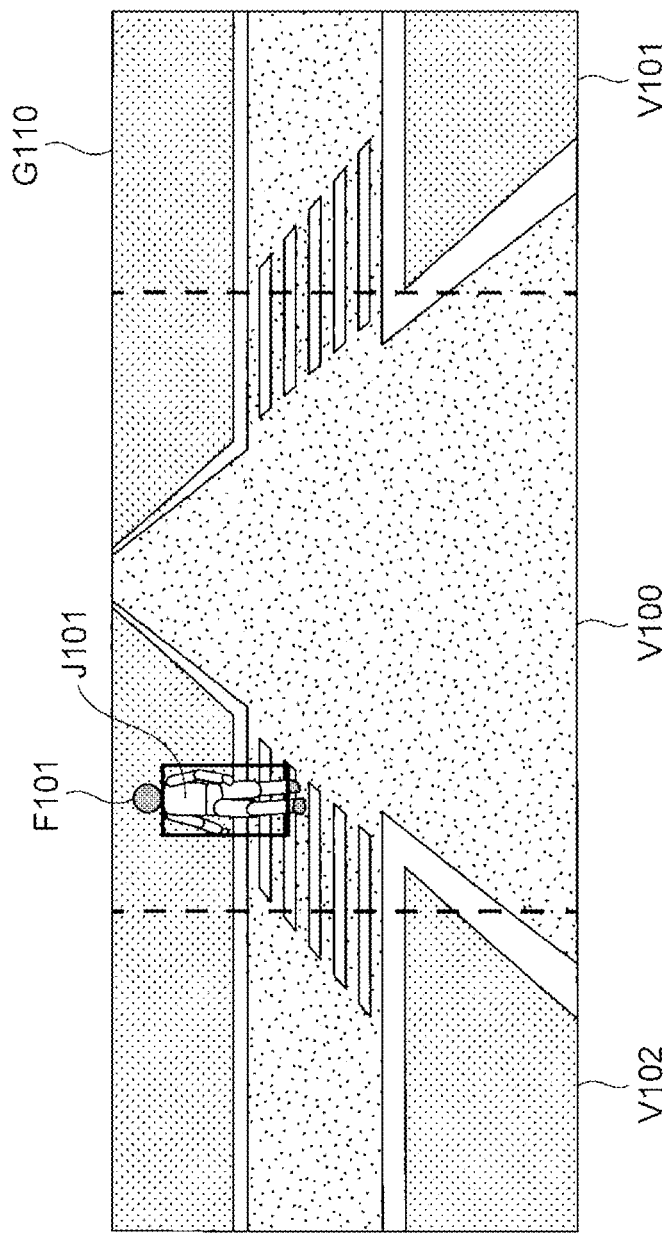

OBJECT RECOGNITION DEVICE

TECHNICAL FIELD

The present invention relates to an object recognition device.

BACKGROUND ART

In order to realize automatic driving and prevent traffic accidents, there is a great interest in an automatic brake function that detects a pedestrian and performs brake control. In the automatic brake function, it is necessary to accurately calculate the distance from the own vehicle to the pedestrian. As a method of calculating the distance to the pedestrian, PTL 1 discloses a method of calculating the distance from the grounding position of the pedestrian on the image and the attachment position information of the vehicle of the imaging means.

CITATION LIST

Patent Literature

PTL 1: JP 2011-65338 A

SUMMARY OF INVENTION

Technical Problem

In the method described in PTL 1, it is necessary to estimate the grounding position between the road surface and the foot. However, in a case where colors of the road surface and trousers of the pedestrian are similar to each other, it is difficult to estimate a boundary between the foot and the road surface with high accuracy, and there is a problem that distance accuracy decreases.

In view of such a problem, an object of the present invention is to provide an object recognition device capable of accurately estimating a distance from an own vehicle to an object such as a pedestrian.

Solution to Problem

In order to solve the above problems, an object recognition device according to the present invention includes: a sensor information acquisition unit that acquires sensor information obtained by sensing a periphery; an image acquisition unit that acquires an image obtained by capturing an image of a periphery; a distance information acquisition unit that acquires distance information with respect to an overlapping region where sensing regions of the sensor information acquisition unit and the image acquisition unit overlap; an overlapping region object detection unit that detects an object from the overlapping region on a basis of the distance information acquired by the distance information acquisition unit; a part specification unit that determines a specific part region in the object by analyzing an image of a region corresponding to the object detected by the overlapping region object detection unit; an image information storage unit that stores image information regarding a part region determined by the part specification unit; a three-dimensional information acquisition unit that acquires three-dimensional information of a part region specified by the part specification unit based on the distance information acquired by the distance information acquisition unit; a non-overlapping region object detection unit that refers to the image information stored in the image information storage unit with respect to a non-overlapping region where sensing regions of the sensor information acquisition unit and the image acquisition unit do not overlap, and detects a similar part region having a part region specified by the part specification unit or a part of a part region specified by the part specification unit; and a distance calculation unit that calculates a distance to an object including the part region or the similar part region based on detection region information on the image of the part region or the similar part region detected by the non-overlapping region object detection unit and the three-dimensional information acquired by the three-dimensional information acquisition unit.

Advantageous Effects of Invention

According to the present invention, it is possible to accurately estimate a distance from an own vehicle to an object such as a pedestrian.

Objects, configurations, and effects besides the above description will be apparent through the explanation on the following embodiments.

BRIEF DESCRIPTION OF DRAWINGS

FIG. 2A is an overhead view illustrating a positional relationship between a vehicle and a pedestrian at an intersection (the pedestrian is in an overlapping region) for explaining Operation Example 1 of the object recognition device according to the first embodiment disclosed in FIG. 1.

FIG. 2B is an overhead view illustrating a positional relationship between the vehicle and the pedestrian at the intersection (the pedestrian is in a non-overlapping region) for explaining Operation Example 1 of the object recognition device according to the first embodiment disclosed in FIG. 1.

FIG. 3A is a diagram illustrating a position (in the overlapping region) of the pedestrian at a viewpoint of a camera attached to the vehicle for explaining Operation Example 1 of the object recognition device according to the first embodiment disclosed in FIG. 1.

FIG. 3B is a diagram illustrating a position (in the non-overlapping region) of the pedestrian at the viewpoint of the camera attached to the vehicle for explaining Operation Example 1 of the object recognition device according to the first embodiment disclosed in FIG. 1.

FIG. 10A is a diagram for explaining an operation example of the object recognition device according to the second embodiment disclosed in FIG. 8 from a viewpoint of the camera attached to the vehicle.

FIG. 13A is a diagram illustrating a position (in an overlapping region) of the pedestrian at a viewpoint of the camera attached to the vehicle for explaining an operation example of the object recognition device in the third embodiment disclosed in FIG. 12.

DESCRIPTION OF EMBODIMENTS

Figure 1:
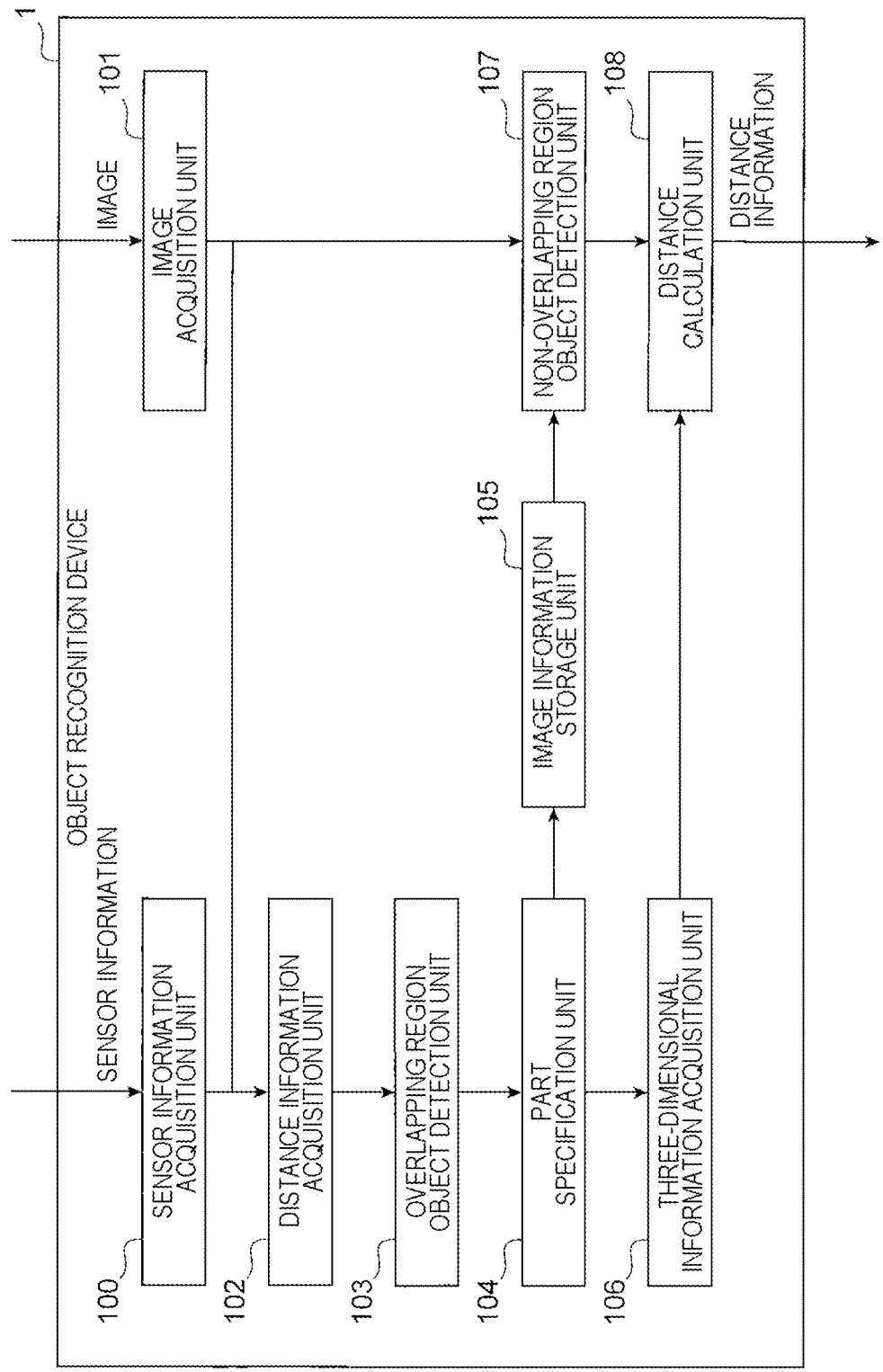
FIG. 1 is a functional block diagram illustrating a configuration of an object recognition device according to a first embodiment of the present invention.

Hereinafter, embodiments of the present invention will be described in detail using the drawings. In the following description of the embodiments, parts having the same function are denoted by the same or related reference numerals, and repeated description thereof may be omitted.

First Embodiment

An object recognition device 1 according to the present embodiment acquires sensor information obtained by sensing (monitoring or recognizing) a periphery from a sensor (not illustrated), acquires an image obtained by imaging the periphery from a camera (not illustrated), recognizes an object (such as a pedestrian) present in the periphery on the basis of the acquired information, and calculates a distance to the object.

(Functional block configuration example) FIG. 1 is a functional block diagram illustrating a configuration of the object recognition device 1 according to the first embodiment.

The object recognition device 1 of the present embodiment includes a camera, a computer, a memory, a storage device, and the like, and the computer operates as various functional units by executing a control program stored in the memory or the like.

As illustrated in FIG. 1, the object recognition device 1 includes a sensor information acquisition unit 100, an image acquisition unit 101, a distance information acquisition unit 102, an overlapping region object detection unit 103, a part specification unit 104, an image information storage unit 105, a three-dimensional information acquisition unit 106, a non-overlapping region object detection unit 107, and a distance calculation unit 108 as functional units realized by the operation of the camera or the computer.

The sensor information acquisition unit 100 acquires and collects sensor information of a target sensor. Here, the target sensor is a camera, a millimeter wave, a laser radar, a far-infrared camera, or the like. Hereinafter, a description will be given on the assumption that a target sensor in the sensor information acquisition unit 100 is a camera.

The image acquisition unit 101 acquires image data captured by the camera.

In the present embodiment, the sensing regions (hereinafter, sometimes referred to as a visual field) of (the target camera of) the sensor information acquisition unit 100 and (the target camera of) the image acquisition unit 101 are set so as to partially overlap each other.

Here, the sensor information acquisition unit 100 and the image acquisition unit 101 are described as separate bodies from the camera including an optical lens, an optical sensor, and the like, but may be integrated with the camera (in other words, the sensor information acquisition unit 100 or the image acquisition unit 101 may constitute the camera itself).

The distance information acquisition unit 102 calculates distance information for an overlapping region where the sensing regions of the sensor information acquisition unit 100 and the image acquisition unit 101 overlap. In the calculation of the distance information, either or both of the sensor information acquisition unit 100 and the image acquisition unit 101 can be used. When a camera is used in the sensor information acquisition unit 100, a distance can be obtained by performing stereo matching on a region (overlapping region) sharing a visual field with the image acquisition unit 101. Specifically, a parallax is calculated by obtaining a corresponding pixel in the image data of the image acquisition unit 101 for a certain pixel of the image data that is the sensor information of the sensor information acquisition unit 100. With respect to the obtained parallax, the distance can be calculated from the positional relationship, the focal length, and pixel size information of the target camera of the sensor information acquisition unit 100 and the image acquisition unit 101. Here, other arbitrary distance estimation means can be used in addition to the stereo matching. The overlapping region of the visual fields is not limited to a region formed of an integrated sensor device, but is also a region of the visual field formed of separate sensor devices.

The overlapping region object detection unit 103 detects an object from the region (overlapping region) in which the visual fields of the sensor information acquisition unit 100 and the image acquisition unit 101 are shared on the basis of the distance information acquired by the distance information acquisition unit 102. Specifically, by connecting pixels having similar parallax values, an object can be detected from the overlapping region. As another method, an object may be detected by a discriminator that has learned the statistical tendency of the parallax value information. In addition, any object detection means can be used. Hereinafter, a description will be given on the assumption that the object detected by the overlapping region object detection unit 103 is a pedestrian. However, the generality of the present invention is not lost even when the object to be detected is an object other than a pedestrian.

The part specification unit 104 determines a specific part region in the pedestrian on the basis the image information of the pedestrian detected by the overlapping region object detection unit 103, in other words, by analyzing the image of the region corresponding to the pedestrian detected by the overlapping region object detection unit 103. The image information used here is information of either the sensor information acquisition unit 100 or the image acquisition unit 101 in a case where a camera is used in the sensor information acquisition unit 100. In the determination of the specific part region, a contrast change point regarding brightness and darkness of the object detected by the overlapping region object detection unit 103 is detected, and a brightly imaged region is detected as a pedestrian part region. The contrast change point can be detected by calculating a histogram for each row with respect to the image of the object region (region corresponding to the object) detected by the overlapping region object detection unit 103, and obtaining a point where the change amount of the adjacent histogram is a predetermined value or more.

The image information storage unit 105 stores the image information on the pedestrian part region detected and determined by the part specification unit 104.

The three-dimensional information acquisition unit 106 acquires three-dimensional information of the part region specified by the part specification unit 104 on the basis of the distance information acquired by the distance information acquisition unit 102. Here, the three-dimensional information is the height of the specified part region from the road surface, or the actual size (actual dimension) of the height and width of the part region.

The non-overlapping region object detection unit 107 refers to the image information stored in the image information storage unit 105, and detects the part region specified by the part specification unit 104 from a region (non-overlapping region) in which the sensor information acquisition unit 100 and the image acquisition unit 101 do not share a visual field. As a method of detecting the part region, for example, there is template matching using the image information stored in the image information storage unit 105 as a template. Note that, in a case where the sensor information acquisition unit 100 does not use a camera, the part region specified by the part specification unit 104 is detected with reference to the image information stored in the image information storage unit 105 with respect to the non-overlapping region including the image information that does not overlap with the sensing region of the sensor information acquisition unit 100 in the visual field (sensing region) of the image acquisition unit 101.

The distance calculation unit 108 calculates the distance to the pedestrian including the part region detected by the non-overlapping region object detection unit 107 on the basis of detection region information (more specifically, position information and size information) on the image of the part region detected by the non-overlapping region object detection unit 107 and the three-dimensional information acquired by the three-dimensional information acquisition unit 106.

(Operation Example 1) Next, an operation example of the object recognition device 1 of the present embodiment in the scenes illustrated in FIGS. 2A and 2B and FIGS. 3A and 3B will be described with reference to the flowchart of FIG. 4. In the following operation example, it is assumed that the object recognition device 1 is mounted on a vehicle and includes two target cameras (for example, a stereo camera including a right camera and a left camera) of the sensor information acquisition unit 100 and the image acquisition unit 101. Therefore, in the present operation example, the sensor information acquisition unit 100 and the image acquisition unit 101 acquire an image obtained by imaging the periphery of the vehicle.

FIGS. 2A and 2B and FIGS. 3A and 3B illustrate scenes in which a pedestrian crosses in front of a vehicle turning left at an intersection. FIGS. 2A and 2B illustrate an overhead view, and FIGS. 3A and 3B are diagrams from a viewpoint viewed from the camera attached to the vehicle. In FIGS. 2A and 2B and FIGS. 3A and 3B, F101 represents a crossing pedestrian, and F102 represents a vehicle. V100, V101, and V102 represent sensing regions (visual fields), V101 and V102 represent non-overlapping regions of the visual fields, and V100 represents overlapping regions of the visual fields. S100 in FIG. 2A is a scene before turning left at the intersection, and S101 in FIG. 2B is a scene during turning left at the intersection. G100 in FIG. 3A is the camera viewpoint in S100 in FIG. 2A, and G101 in FIG. 3B is the camera viewpoint in S101 in FIG. 2B.

Figure 4:
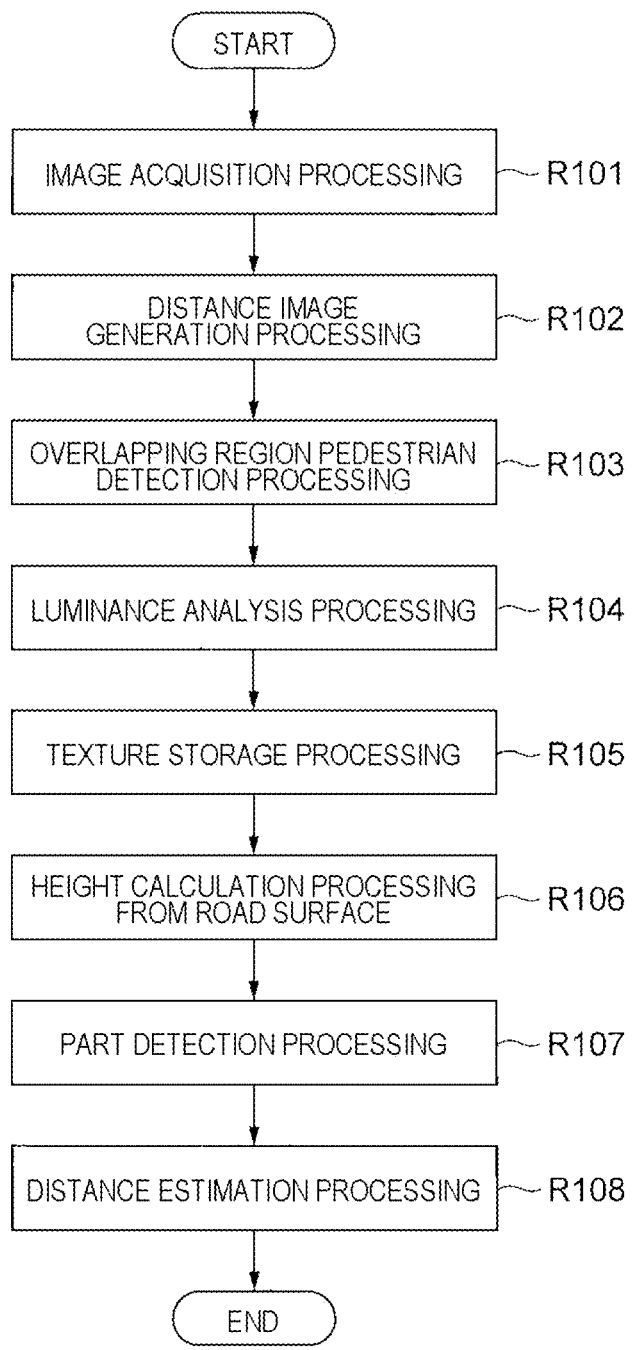
FIG. 4 is a flowchart illustrating Operation Example 1 of the object recognition device according to the first embodiment disclosed in FIG. 1.

In the present operation example, as illustrated in FIG. 4, the object recognition device 1 sequentially performs image acquisition processing (R101), distance image generation processing (R102), overlapping region pedestrian detection processing (R103), luminance analysis processing (R104), texture storage processing (R105), height calculation processing from a road surface (R106), part detection processing (R107), and distance estimation processing (R108), recognizes a pedestrian at an intersection, and calculates a distance from the vehicle to the pedestrian. The above-described image acquisition processing (R101) is executed by the sensor information acquisition unit 100 and the image acquisition unit 101, the distance image generation processing (R102) is executed by the distance information acquisition unit 102, the overlapping region pedestrian detection processing (R103) is executed by the overlapping region object detection unit 103, the luminance analysis processing (R104) is executed by the part specification unit 104, the texture storage processing (R105) is executed by the image information storage unit 105, the height calculation processing from the road surface (R106) is executed by the three-dimensional information acquisition unit 106, the part detection processing (R107) is executed by the non-overlapping region object detection unit 107, and the distance estimation processing (R108) is executed by the distance calculation unit 108. Hereinafter, each processing content will be described.

The object recognition device 1 acquires an image from each of the two cameras (R101). A distance image as distance information is generated by performing stereo matching processing on an overlapping region V100 having overlapping visual fields in the acquired two images (R102). By referring to the generated distance image and combining pixels having similar distances, a pedestrian F101 as an object is detected from the overlapping region V100 (R103).

Figure 5:
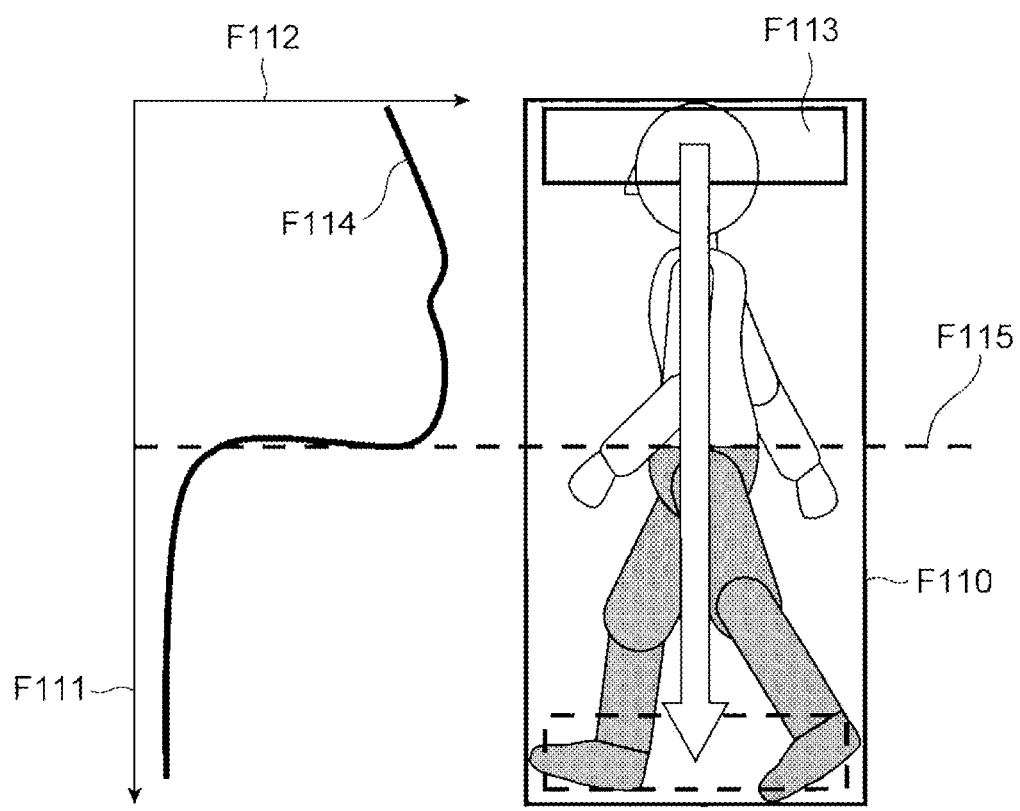
FIG. 5 is a diagram illustrating a method of analyzing a luminance value of an image and detecting a change point at which contrast change of brightness and darkness is large in the object recognition device according to the first embodiment disclosed in FIG. 1.

Next, by analyzing the luminance value of the image of the detected pedestrian region (region corresponding to the pedestrian), a part region that is brightly and clearly imaged is extracted from the pedestrian region (R104). The extraction of the part region will be described with reference to FIG. 5. In FIG. 5, F110 indicates a pedestrian region detected by the overlapping region pedestrian detection processing (R103). F111 is an axis related to the pixel position in the longitudinal direction of the pedestrian region, and F112 is an axis related to the sum value of the luminance values in the rectangular window illustrated in F113. F114 indicates a histogram acquired by searching the rectangular window indicated by F113 downward of the image. The upper body of the pedestrian detected in F110 is captured brightly, whereas the lower body is captured darkly. Therefore, the histogram illustrated in F114 has a high value for the upper body and a low value for the lower body. In the luminance analysis processing (R104), a histogram is calculated according to the above procedure, an adjacent difference in the vertical direction of the histogram is acquired, and a change point regarding the contrast at which the difference value is a predetermined value or more is detected. F115 indicates a detected change point. In the luminance analysis processing (R104), a change point with a large contrast change in brightness and darkness is detected, a region having a high histogram value is detected as a specific part region, and image information of the part region is stored (R105).

In the height calculation processing from the road surface (R106), the height from the road surface of the part region specified in the luminance analysis processing (R102) is calculated with reference to the distance image generated in the distance image generation processing (R104). The height H from the road surface is calculated according to a calculation formula of $H=(w*Z*y)/f$ in a case where a depth distance Z calculated from the distance image, a lower end position y in the image of the part region specified by the luminance analysis processing (R104), a focal length f of the camera, and a pixel size w are set on the assumption that there is no inclination of the road surface.

According to the above processing, when the pedestrian F101 is imaged in the overlapping region V100 of the visual field as illustrated in G100 of FIG. 3A, it is possible to specify a brightly imaged part region of the pedestrian region. In the following processing, the distance information of the pedestrian F101 illustrated in G101 of FIG. 3B is estimated on the basis of the part region specified in the scene illustrated in G100 of FIG. 3A. Here, when one or both of the pedestrian F101 and the vehicle F102 move at the intersection, the pedestrian F101 illustrated in G101 of FIG. 3B (relatively) transitions from the overlapping region V100 of the visual fields indicated by G100 of FIG. 3A to the non-overlapping region V101 of the visual fields (see also FIGS. 2A and 2B).

In the part detection processing (R107), the image information stored in the texture storage processing (R105) is referred to, and the same portion as the pedestrian part region specified in the luminance analysis processing (R104) is detected in the pedestrian F101 captured in the non-overlapping region V101. The image information stored in the texture storage processing (R105) is treated as a template, and is detected by template matching. In the template matching processing, the template is scanned in the horizontal and vertical directions of the image, and a correlation value with the template is calculated for each coordinate position. By detecting the peak value of the correlation value, the part region specified by the overlapping region V100 is detected from the non-overlapping region V101. When the template matching processing is performed, templates having different sizes are used. As a result, even when the distance between the pedestrian and the vehicle changes with the movement of the vehicle and the size of the pedestrian to be imaged changes, the part region can be detected with high accuracy.

Figure 6:
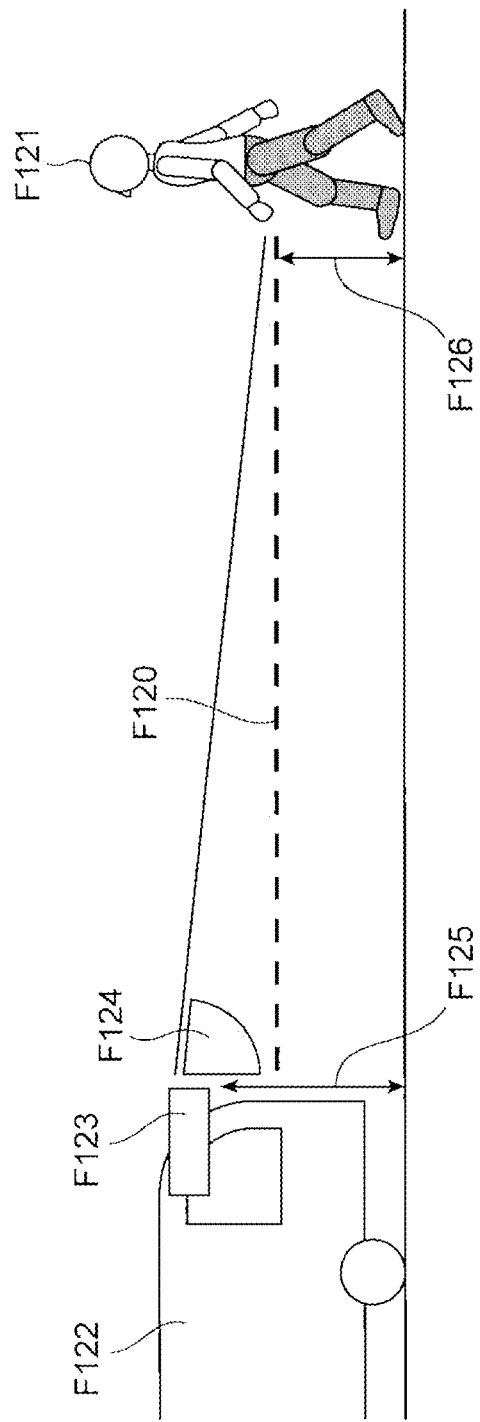
FIG. 6 is a diagram illustrating a method of estimating a distance to the pedestrian in the object recognition device according to the first embodiment disclosed in FIG. 1.

In the distance estimation processing (R108), the depth distance to the pedestrian F101 imaged in the non-overlapping region V101 is estimated from the height of the part region from the road surface acquired in the height from the height calculation processing from the road surface (R106) and the position information on the image of the part region detected in the part detection processing (R107). A method of estimating the depth distance will be described with reference to FIG. 6. In FIG. 6, F121 represents a pedestrian, F122 represents a vehicle, and F123 represents a camera attached to the vehicle. The depth distance Z to be estimated is F120. From the attachment angle of the camera and the position information on the image of the part region detected in the part detection processing (R107), the angle α of the pedestrian part region with respect to the camera illustrated in F124 can be calculated. In addition, the camera height H indicated by F125 can be acquired from the attachment position of the camera. The part region height P indicated by F126 is acquired by height calculation processing (R106) from the road surface. With respect to the above information, the depth distance Z satisfies $Z=(H-P)*A\tan(\alpha)$. In the distance estimation processing (R108), the distance to the pedestrian is calculated on the basis of H, P, and α.

(Operational effects) From the above, for example, the object recognition device 1 of the present embodiment specifies a pedestrian part region brightly and clearly imaged in the overlapping region of the visual field, calculates height information from the road surface, which is three-dimensional information of the specified part region, and detects the part region specified in the overlapping region of the visual field in the non-overlapping region (also referred to as a monocular region) of the visual field, thereby estimating the distance to the pedestrian. As a result, it is possible to estimate the distance to the pedestrian by detecting an arbitrary pedestrian part region other than the foot in the non-overlapping region of the visual field. As a result, even in a scene where the color of the road surface is similar to that of trousers or the like of the pedestrian and the foot position cannot be detected with high accuracy, the distance from the own vehicle to an object such as a pedestrian can be estimated with high accuracy.

Figure 7:
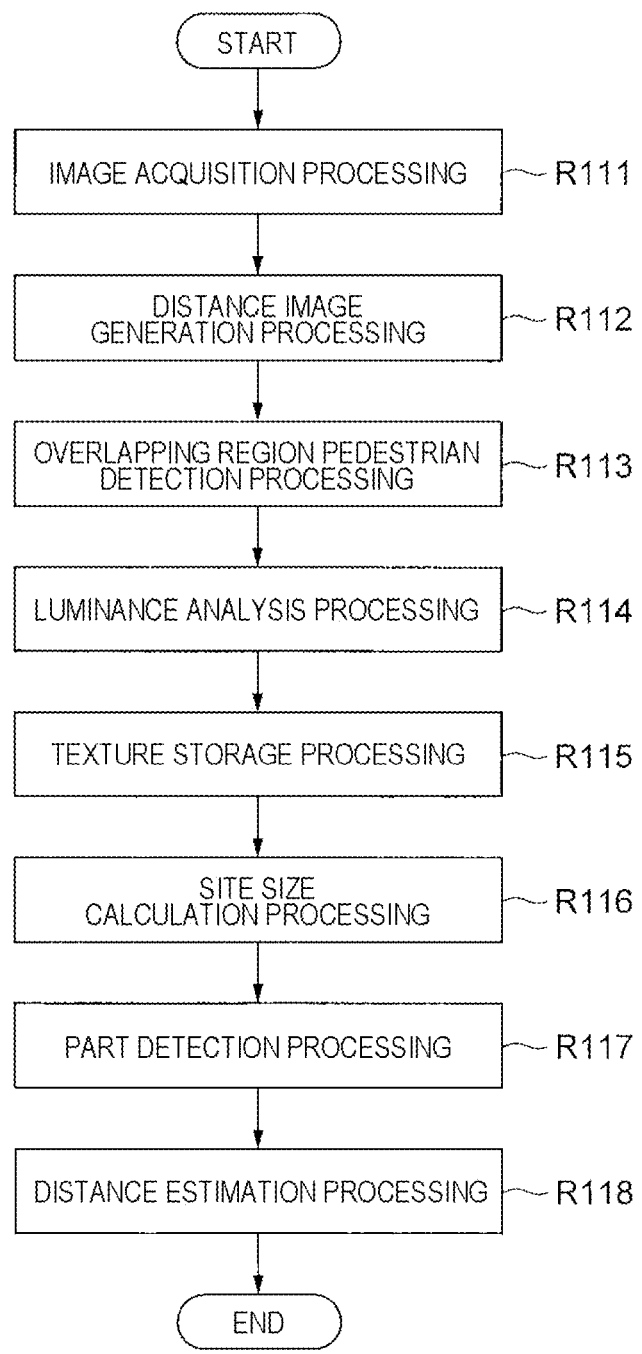
FIG. 7 is a flowchart illustrating Operation Example 2 of the object recognition device according to the first embodiment disclosed in FIG. 1, in which a distance to the pedestrian is estimated on the basis of a height or a width of a part region.

(Operation Example 2) In addition, the object recognition device 1 having the functional blocks illustrated in FIG. 1 can perform processing according to the processing flow illustrated in FIG. 7.

A difference between the processing flow illustrated in FIG. 7 and the processing flow in FIG. 4 described above is that the height calculation processing from the road surface (R106) by the three-dimensional information acquisition unit 106 is replaced with part size calculation processing (R116), and accordingly, the method of calculating the distance in the distance estimation processing (R118) by the distance calculation unit 108 is different. Hereinafter, the difference between the part size calculation processing (R116) and the distance estimation processing (R118) in FIG. 7 will be described.

In the part size calculation processing (R116), the actual size (actual dimension) of the part region detected in the luminance analysis processing (R114) is measured with reference to the distance image generated in the distance image generation processing (R112). Here, the actual size is a height (longitudinal dimension) or a width (lateral dimension) of the part region.

In the distance estimation processing (R118), the distance to the pedestrian F101 as an object is estimated on the basis of the actual size of the part region acquired in the part size calculation processing (R116) and the size of the part region detected in the part detection processing (R117) on the image. A method of estimating the distance will be described. Assuming that S is the actual size of the part region acquired in the part size calculation processing (R116), that s is the size of the part region detected in the part detection processing (R117) on the image, that f is the focal length of the camera, that w is the pixel size of the image, and that Z is the depth distance to be estimated, $Z=(f*S)/(s*w)$ is established. In the distance estimation processing (R118), the depth distance Z is estimated on the basis of S, s, f, and w.

(Operational effects) From the above, the object recognition device 1 of the present embodiment can estimate the distance to the object on the basis of the actual size of the part region and the size on the image without calculating the height of the object from the road surface by performing the distance estimation according to the processing flow illustrated in FIG. 7. As a result, even in a scene where the road surface has an inclination, the distance can be estimated without using the information of the road surface, and the processing time can be reduced.

Second Embodiment

In the object recognition device of the first embodiment described above, there is no inclination of the road surface, but an object recognition device 2 of the present embodiment calculates the distance to an object (pedestrian or the like) existing in the periphery in consideration of the inclination of the road surface.

Figure 8:
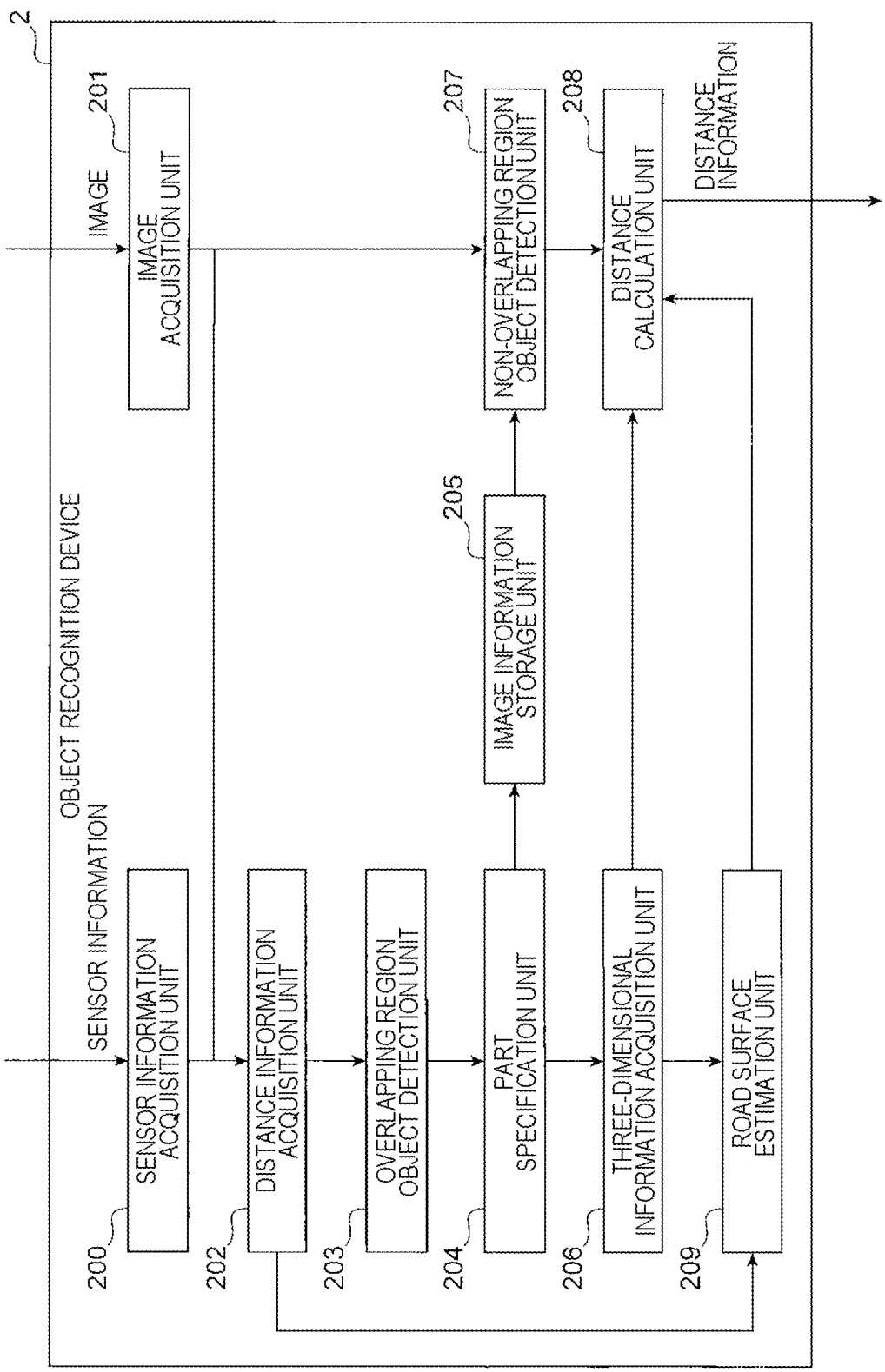
FIG. 8 is a functional block diagram illustrating a configuration of an object recognition device according to a second embodiment of the present invention.

(Functional block configuration example) FIG. 8 is a functional block diagram illustrating a configuration of the object recognition device 2 according to the second embodiment.

The object recognition device 2 of the present embodiment includes a sensor information acquisition unit 200, an image acquisition unit 201, a distance information acquisition unit 202, an overlapping region object detection unit 203, a part specification unit 204, an image information storage unit 205, a three-dimensional information acquisition unit 206, a non-overlapping region object detection unit 207, a distance calculation unit 208, and a road surface estimation unit 209. That is, a difference between the object recognition device 2 of the second embodiment and the object recognition device 1 of the first embodiment is that the road surface estimation unit 209 is added.

The sensor information acquisition unit 200 acquires and collects sensor information of a target sensor. The image acquisition unit 201 acquires image data imaged by the camera. The distance information acquisition unit 202 calculates distance information for an overlapping region where the sensing regions of the sensor information acquisition unit 200 and the image acquisition unit 201 overlap. The overlapping region object detection unit 203 detects an object from the region (overlapping region) in which the visual fields of the sensor information acquisition unit 200 and the image acquisition unit 201 are shared on the basis of the distance information acquired by the distance information acquisition unit 202. The part specification unit 204 determines a specific part region in the pedestrian on the basis the image information of the pedestrian detected by the overlapping region object detection unit 203, in other words, by analyzing the image of the region corresponding to the pedestrian detected by the overlapping region object detection unit 203. The image information storage unit 205 stores the image information on the pedestrian part region detected and determined by the part specification unit 204. The three-dimensional information acquisition unit 206 acquires three-dimensional information of the part region specified by the part specification unit 204 on the basis of the distance information acquired by the distance information acquisition unit 202. Here, the three-dimensional information is the height of the specified part region from the road surface, or the actual size (actual dimension) of the height and width of the part region.

The road surface estimation unit 209 estimates the shape of the road surface, that is, the inclination on the basis of the distance information acquired by the distance information acquisition unit 202. As a method of estimating the inclination of the road surface, the road surface region is specified from the image, and the shape of the road surface is estimated with reference to the distance image in the specified road surface region. In specifying the road surface region, a white line may be detected, and a region within the detected white line may be set as the road surface region. Alternatively, a predetermined region set in advance in the image region may be set as the road surface region. A method of estimating the shape of the road surface from the set road surface region will be described. An average distance for each vertical pixel is acquired with reference to the distance image. Assuming that the target vertical pixel position is y, the calculated average distance is z, the focal length is f, and the pixel size is w, a road surface height H satisfies the following equation: $H=(y*w*z)/f$. The road surface estimation unit 209 calculates the road surface height for each vertical pixel according to the above-described calculation method. Further, the road surface height of each vertical pixel may be greatly different for each adjacent vertical pixel due to the influence of noise in the distance image. In that case, the influence of noise may be suppressed by applying a straight line to the road surface height of each vertical pixel. Although the method of estimating the inclination of the road surface by the road surface estimation unit 209 has been described above, any road surface shape estimation method can be applied in the road surface estimation unit 209.

The non-overlapping region object detection unit 207 refers to the image information stored in the image information storage unit 205, and detects the part region specified by the part specification unit 204 from a region (non-overlapping region) in which the sensor information acquisition unit 200 and the image acquisition unit 201 do not share a visual field.

The distance calculation unit 208 calculates the distance to the pedestrian including the part region detected by the non-overlapping region object detection unit 207 on the basis of detection region information (more specifically, position information and size information) on the image of the part region detected by the non-overlapping region object detection unit 207, the three-dimensional information acquired by the three-dimensional information acquisition unit 206, and inclination information of the road surface estimated by the road surface estimation unit 209. Specifically, the angle information of the camera and the pedestrian part region and the height of the road surface contacting the pedestrian are calculated from the detection region information on the image of the part region detected by the non-overlapping region object detection unit 207 and the inclination information of the road surface estimated by the road surface estimation unit 209. Then, the distance from the vehicle to the pedestrian is estimated from the calculated angle information of the camera and the pedestrian part region, the height of the road surface contacting the pedestrian, and the three-dimensional information acquired by the three-dimensional information acquisition unit 206.

Figure 9:
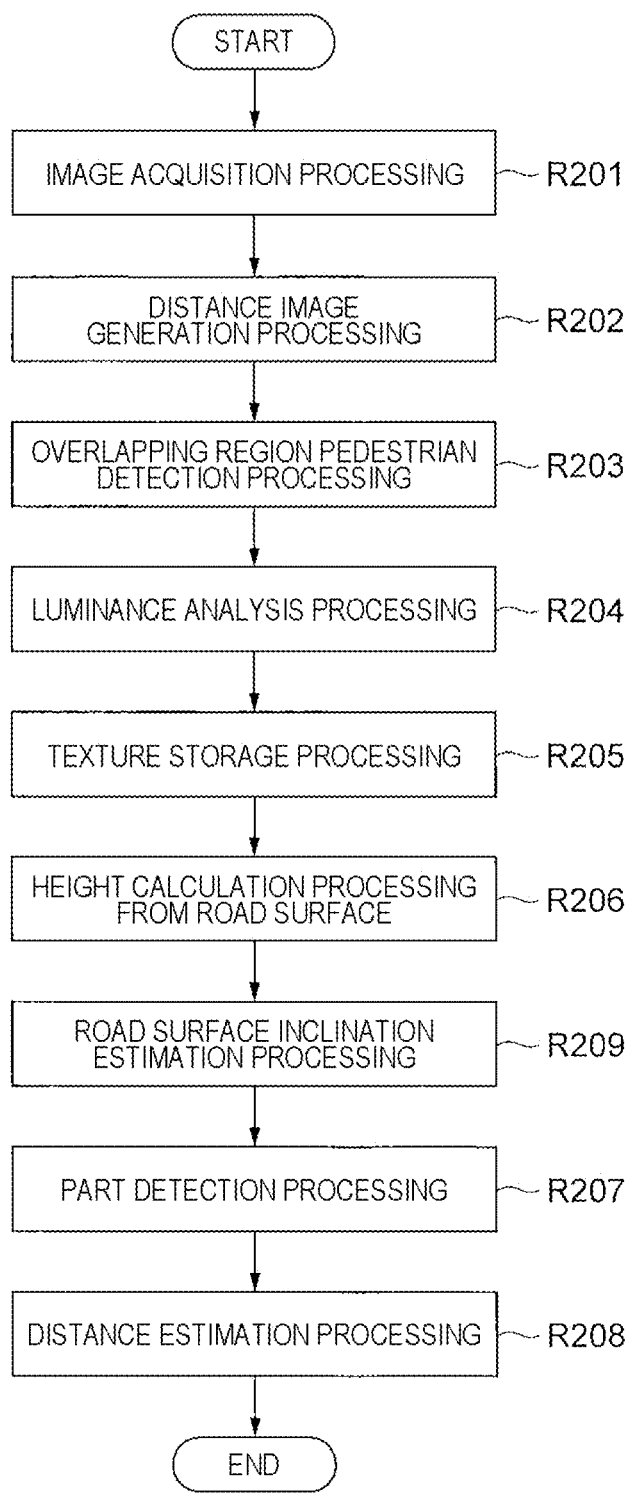
FIG. 9 is a flowchart illustrating an operation example of the object recognition device according to the second embodiment disclosed in FIG. 8.

(Operation Example) An operation example of the object recognition device 2 of the present embodiment will be described with reference to a flowchart of FIG. 9. The target scene is a scene at the intersection illustrated in FIGS. 2A and 2B, and the road surface at the intersection is inclined. In the present operation example, differences from the processing performed by the flowchart of FIG. 4 in the first embodiment described above are road surface inclination estimation processing (R209) by the road surface estimation unit 209 of FIG. 9 and distance estimation processing (R208) by the distance calculation unit 208. Therefore, hereinafter, the road surface inclination estimation processing (R209) and the distance estimation processing (R208) in FIG. 9, which are differences, will be described in detail.

Figure 10B:
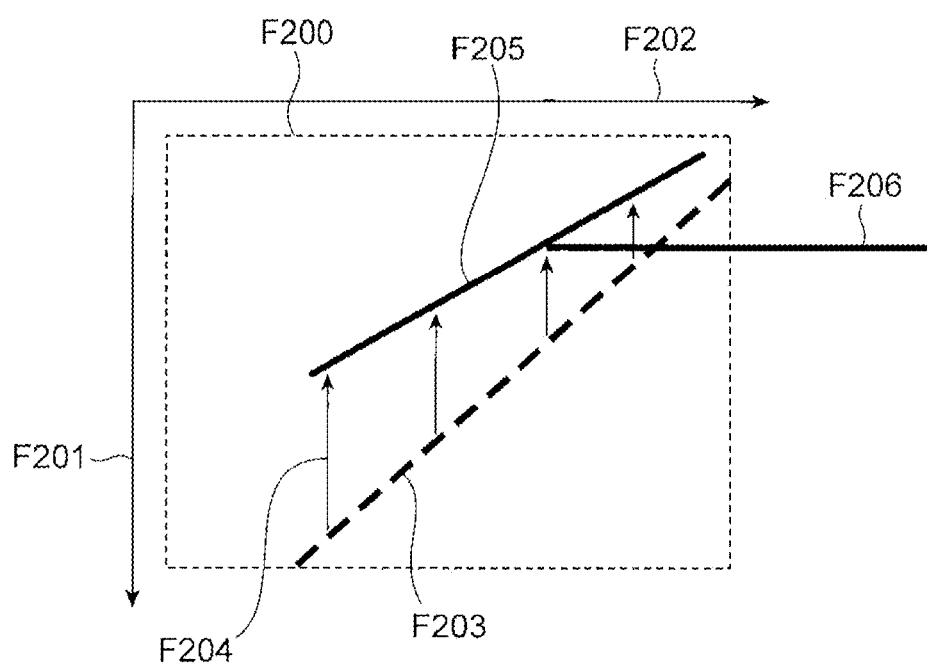
FIG. 10B is a diagram illustrating a method of calculating the inclination of a road surface in the object recognition device according to the second embodiment disclosed in FIG. 8.

In the road surface inclination estimation processing (R209), the height of the road surface in front of the vehicle is estimated. The road surface inclination estimation processing (R209) will be described with reference to FIGS. 10A and 10B. G101 in FIG. 10A indicates a camera viewpoint at the time of turning left at the intersection illustrated in S101 in FIG. 2B. V100 indicates an overlapping region of the visual field, and V101 and V102 indicate non-overlapping regions of the visual field. F101 indicates a pedestrian. In the road surface inclination estimation processing (R209), the road surface region is set, and the height of the road surface with respect to each vertical pixel of the image is calculated. F200 in FIG. 10A indicates a road surface region. As the road surface region, a preset area in the overlapping region V100 of the visual field is set. FIG. 10B illustrates an estimation result of the road surface height in the road surface region F200. F201 indicates each vertical pixel position of the image, and F202 indicates the height from the road surface. In the road surface inclination estimation processing (R209), the height from the road surface is calculated with reference to the distance image for each vertical pixel of F201. In the height calculation, the average distance of each vertical pixel of the distance image is calculated, and the height from the road surface is calculated from the calculated average distance, vertical pixel position, focal length, and pixel size. The above processing is performed for each image vertical position of F201, and road surface height information for each image vertical position illustrated in F203 is calculated. Next, by using the height information of the pedestrian part region calculated in the height calculation processing from the road surface (R206), an offset F204 is added to the road surface height information for each image vertical position shown in F203 by the height on the image of the pedestrian part region, and the resultant is converted into road surface height information in the pedestrian part region shown in F205. A method of calculating the offset F204 will be described. The offset F204 is the size h on the image of the pedestrian part region. When the height of the pedestrian part region calculated in the height calculation processing from the road surface (R206) is H, the average distance of each vertical pixel of the distance image is z, the camera focal length is f, and the pixel size is w, the part size h on the image satisfies the following expression $h=(f*H)/(w*z)$. Therefore, for F204, the offset amount is calculated with respect to the above-described calculation method, and the road surface height information at the height of each pedestrian part region indicated by F205 is calculated. By adding the offset F204, as indicated by F206, the road surface height information can be acquired from the image vertical position of the pedestrian part region in the non-overlapping region V101 of the visual field.

Figure 11:
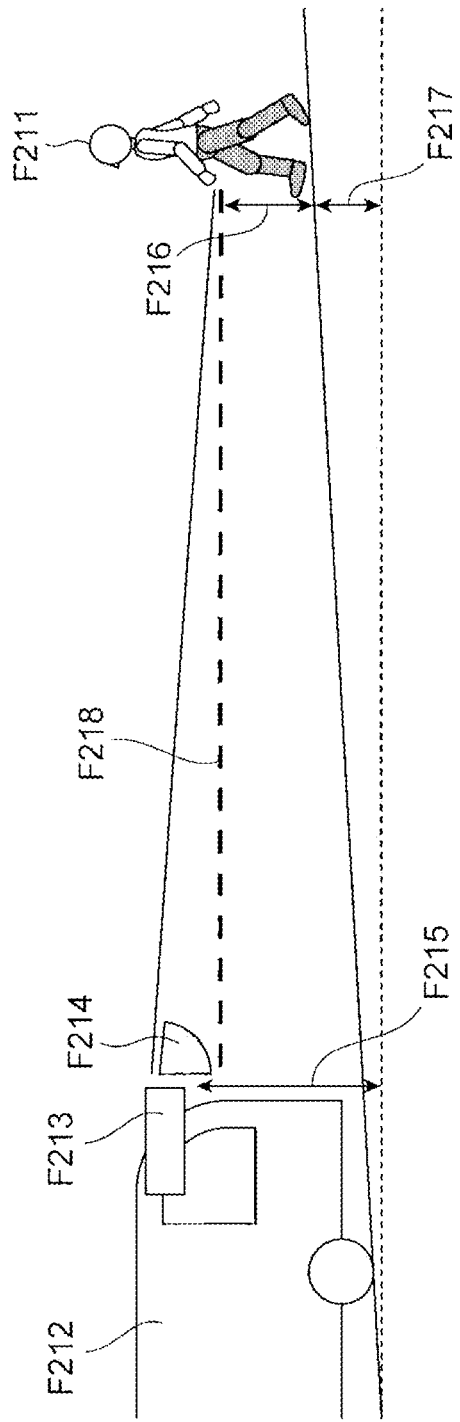
FIG. 11 is a diagram illustrating a method of estimating a distance to the pedestrian in the object recognition device according to the second embodiment disclosed in FIG. 8.

In the distance estimation processing (R208), the distance from the vehicle to the pedestrian is calculated from the height of the pedestrian part region from the road surface calculated in the height calculation processing from the road surface (R206), the detection region information on the image of the pedestrian part region detected in the part detection processing (R207), and the inclination information of the road surface estimated in the road surface inclination estimation processing (R209). A method of distance calculation will be described with reference to FIG. 11. In FIG. 11, F211 indicates a pedestrian, F212 indicates a vehicle, F213 indicates a camera attached to the vehicle, F214 indicates detection region information (position information) on an image of the pedestrian part region detected in the part detection processing (R207), and an angle α to the pedestrian part region with respect to the camera, which can be calculated from the attachment angle information of the camera, F215 indicates an installation height H of the camera, F216 indicates a height P of the pedestrian part region calculated in the height calculation processing from the road surface (R206), and F217 indicates height information R of the road surface acquired in the road surface inclination estimation processing (R209). Here, the estimated distance Z to the pedestrian is F218, and satisfies the following equation $Z=(H-P-R)*A \tan(\alpha)$. In the distance estimation processing (R208), the distance to the pedestrian is calculated according to the above calculation method.

(Operational effects) As described above, the object recognition device 2 according to the present embodiment calculates the shape (inclination) information of the road surface, and calculates the distance to the pedestrian with reference to the calculated shape (inclination) information of the road surface. This makes it possible to accurately estimate the distance from the own vehicle to an object such as a pedestrian even when the road surface is inclined.

Third Embodiment

In the object recognition device 1 of the first embodiment described above, a scene in which the appearance of the same part does not change or hardly changes for each frame has been described. However, for example, in a case where the same part is illuminated by a headlight at night, the appearance of the same part may change for each frame. Even in such a scene, an object recognition device 3 of the present embodiment calculates the distance to an object (such as a pedestrian) existing in the periphery.

Figure 12:
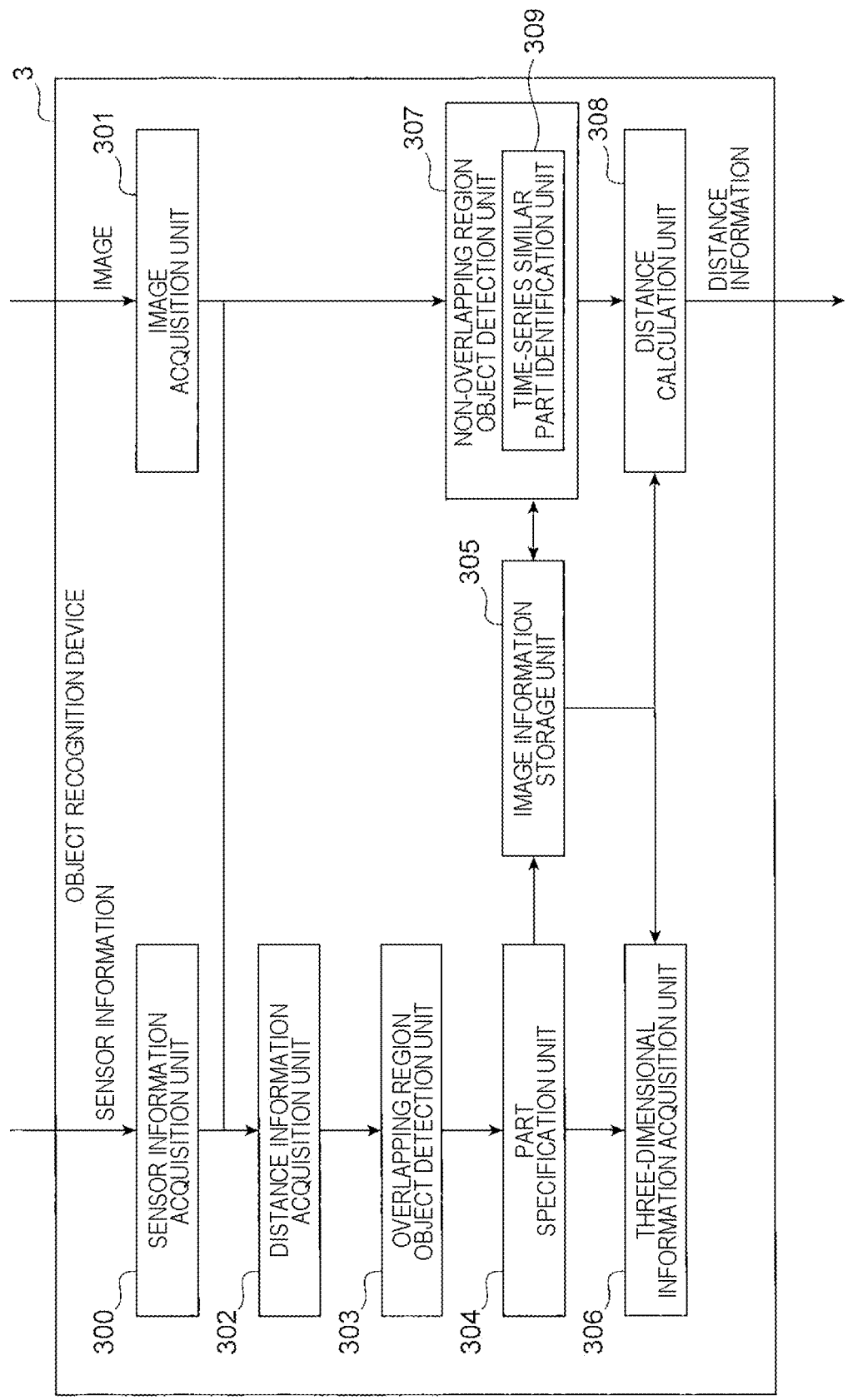
FIG. 12 is a functional block diagram illustrating a configuration of an object recognition device according to a third embodiment of the present invention.

(Functional block configuration example) FIG. 12 is a functional block diagram illustrating a configuration of the object recognition device 3 according to the third embodiment.

The object recognition device 3 of the present embodiment includes a sensor information acquisition unit 300, an image acquisition unit 301, a distance information acquisition unit 302, an overlapping region object detection unit 303, a part specification unit 304, an image information storage unit 305, a three-dimensional information acquisition unit 306, a non-overlapping region object detection unit 307, and a distance calculation unit 308, and the non-overlapping region object detection unit 307 includes a time-series similar part specification unit 309. That is, the difference between the object recognition device 3 of the third embodiment and the object recognition device 1 of the first embodiment is the processing content in the non-overlapping region object detection unit 307.

The sensor information acquisition unit 300 acquires and collects sensor information of a target sensor. The image acquisition unit 301 acquires image data imaged by the camera. The distance information acquisition unit 302 calculates distance information for an overlapping region where the sensing regions of the sensor information acquisition unit 300 and the image acquisition unit 301 overlap. The overlapping region object detection unit 303 detects an object from a region (overlapping region) in which the visual fields of the sensor information acquisition unit 300 and the image acquisition unit 301 are shared on the basis of the distance information acquired by the distance information acquisition unit 302. The part specification unit 304 determines a specific part region in the pedestrian on the basis the image information of the pedestrian detected by the overlapping region object detection unit 303, in other words, by analyzing the image of the region corresponding to the pedestrian detected by the overlapping region object detection unit 303. In the present example, the part specification unit 304 specifies the entire pedestrian region, but may specify a part of the pedestrian region (see FIG. 5). The image information storage unit 305 stores image information on the pedestrian part region detected and determined by the part specification unit 304.

Based on the distance information acquired by the distance information acquisition unit 302 and the image information of the pedestrian detected by the overlapping region object detection unit 303, the three-dimensional information acquisition unit 306 calculates height information from the road surface, which is three-dimensional information of each part region in the entire pedestrian region specified by the part specification unit 304.

The non-overlapping region object detection unit 307 detects the part region of the pedestrian in the non-overlapping region of the visual field on the basis of the image information of the pedestrian part region stored in the image information storage unit 305. Specifically, the time-series similar part specification unit 309 of the non-overlapping region object detection unit 307 refers to the image information of the past pedestrian part region stored in the image information storage unit 305, determines a part region (similar part region) having a similar appearance in the current frame from a region (non-overlapping region) that does not share the visual field between the sensor information acquisition unit 300 and the image acquisition unit 301, and stores the image information of the part region (similar part region) similar in time series in the image information storage unit 305.

The distance calculation unit 308 refers to the detection region information (specifically, position information and size information) on the image of the pedestrian part region detected by the non-overlapping region object detection unit 307 and the distance information of the entire pedestrian region calculated by the three-dimensional information acquisition unit 306, and calculates the distance information to the pedestrian including the pedestrian part region (specifically, the similar part region) detected by the non-overlapping region object detection unit 307.

Figure 13B:
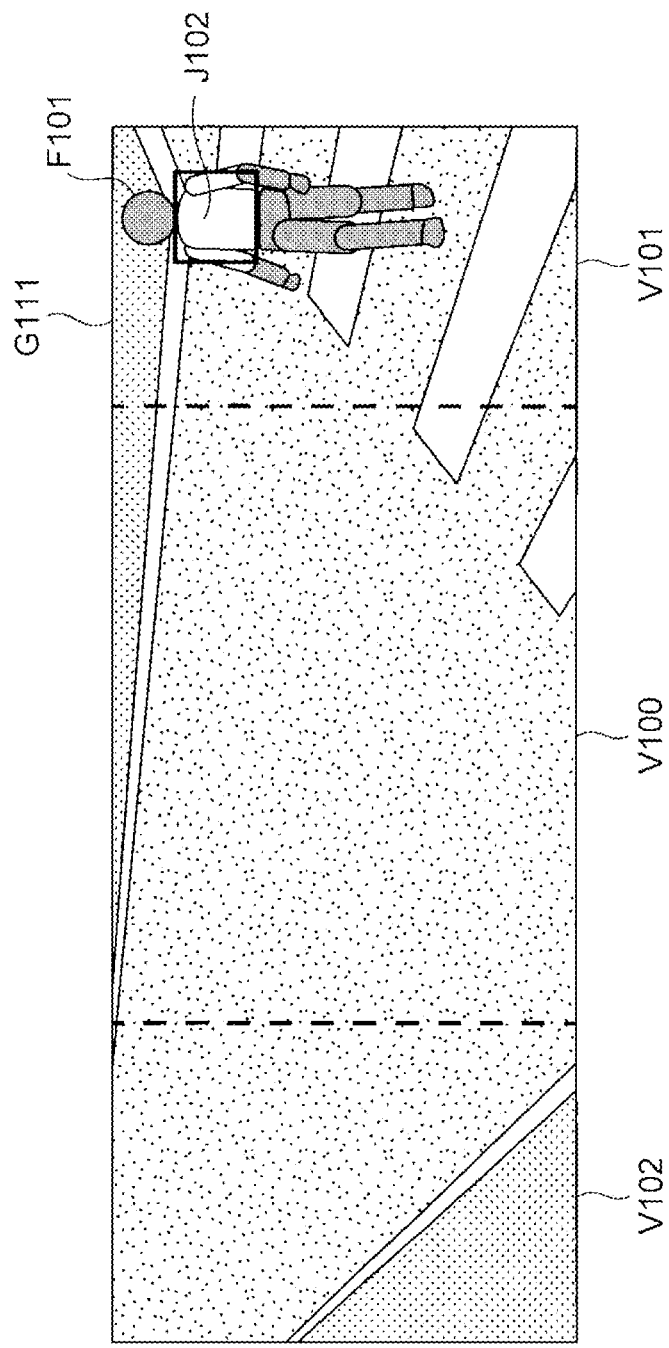
FIG. 13B is a diagram illustrating a position (in the non-overlapping region) of the pedestrian at a viewpoint of the camera attached to the vehicle for explaining the operation example of the object recognition device in the third embodiment disclosed in FIG. 12.

(Operation Example) An operation example of the object recognition device 3 of the present embodiment will be described with reference to a flowchart of FIG. 14. The target scene is a scene at the intersection shown in FIGS. 13A and 13B, and the travel environment is nighttime. G110 in FIG. 13A represents a camera viewpoint before passing through the intersection, and G111 in FIG. 13B represents a camera viewpoint at the time of turning left at the intersection. In FIGS. 13A and 13B, F101 indicates a pedestrian, V101 and V102 indicate non-overlapping regions of visual fields, and V100 indicates overlapping regions of visual fields. J101 and J102 indicate parts of the pedestrian F101 illuminated by the headlight of the vehicle. The reason why the parts irradiated with the headlight are different in J101 and J102 is that the irradiation range of the headlight is different due to a change in the distance between the pedestrian and the vehicle.

Figure 14:
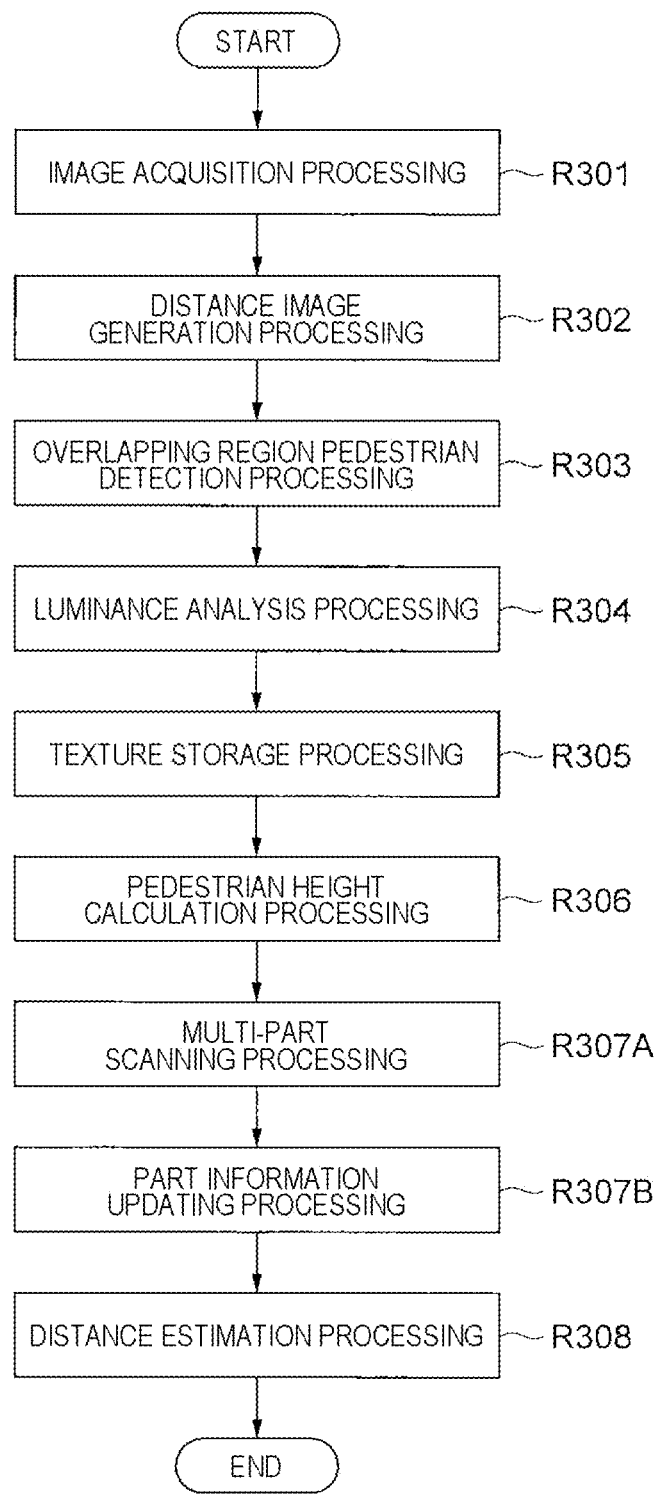
FIG. 14 is a flowchart illustrating an operation example of the object recognition device according to the third embodiment disclosed in FIG. 12.

Differences between the processing performed by the flowchart of FIG. 14 in the present operation example and the processing performed by the flowchart of FIG. 4 in the first embodiment described above are pedestrian height calculation processing (R306) by the three-dimensional information acquisition unit 306 in FIG. 14, multi-part scanning processing (R307A) by (the time-series similar part specification unit 309 of) the non-overlapping region object detection unit 307, part information updating processing (R307B) by the image information storage unit 305, and distance estimation processing (R308) by the distance calculation unit 308. Therefore, hereinafter, the pedestrian height calculation processing (R306), the multi-part scanning processing (R307A), the part information updating processing (R307B), and the distance estimation processing (R308) in FIG. 14, which are differences, will be described in detail.

Figure 15:
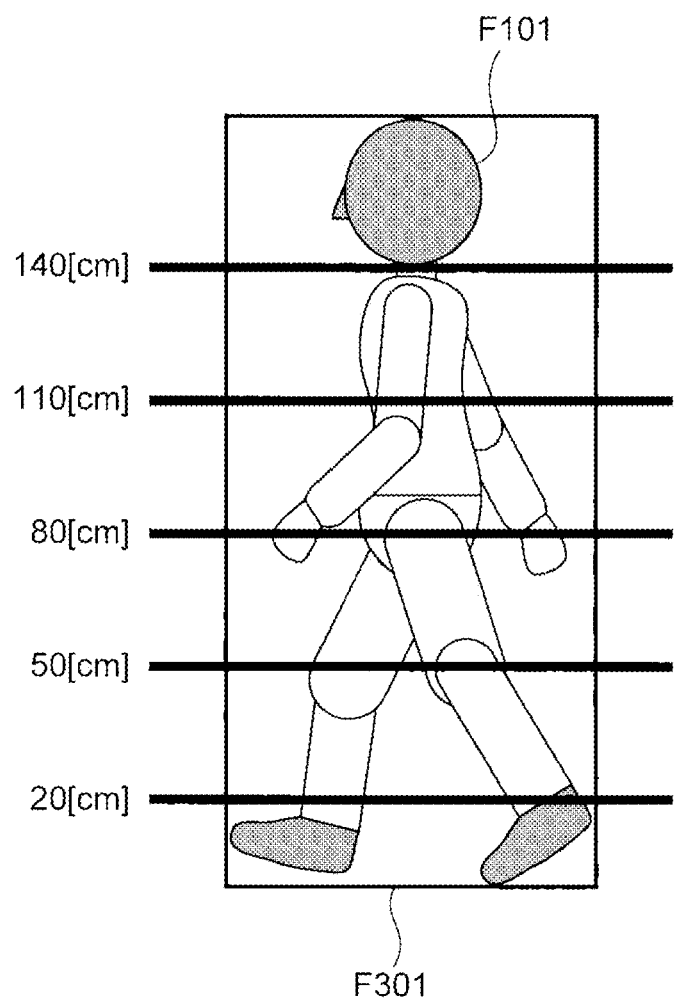
FIG. 15 is a diagram illustrating a method of calculating the height from the road surface for each part region of the pedestrian in the object recognition device according to the third embodiment disclosed in FIG. 12.

In the pedestrian height calculation processing (R306), height information from the road surface of each part region in the entire pedestrian region specified in the luminance analysis processing (R302) is calculated from the distance image generated in the distance image generation processing (R303) and the pedestrian region information detected in the overlapping region pedestrian detection processing (R304). FIG. 15 is a conceptual diagram of height information from the road surface calculated in the pedestrian height calculation processing (R306). In FIG. 15, a pedestrian region detected in the overlapping region pedestrian detection processing (R303) for the pedestrian F101 is indicated by F301. In the pedestrian height calculation processing (R306), as illustrated in FIG. 15, height information from the road surface for each part region in the pedestrian region F301 is calculated, and each part region and height information from the road surface are stored. In FIG. 15, the part region and the height information from the road surface are illustrated at equal intervals, but the height information may not be at equal intervals, and any relationship between the part region and the height from the road surface can be calculated and information can be recorded.

Figure 16:
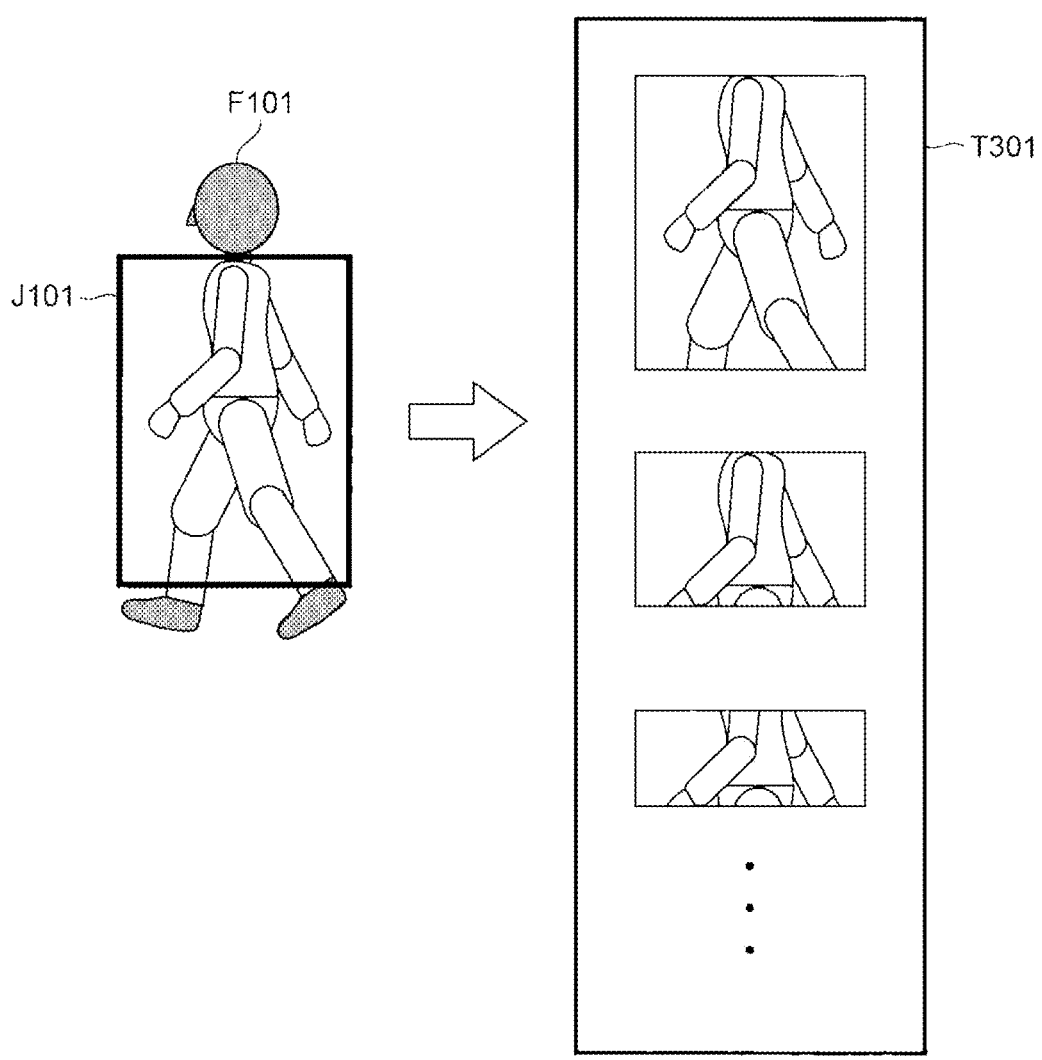
FIG. 16 is a diagram illustrating a method of dividing a pedestrian part region in the object recognition device according to the third embodiment disclosed in FIG. 12.

In the multi-part scanning processing (R307A), the pedestrian part region in the current frame is specified from the non-overlapping region V101 using the past part information stored in the texture storage processing (R305). At that time, the past part information is divided into a plurality of part regions, raster scanning is performed on the current frame, and part regions (similar part regions) similar to each other in the past frame and the current frame are detected. That is, the similar part region having a part of the pedestrian part region in the past frame stored in the texture storage processing (R305) in the current frame is detected from the non-overlapping region V101. FIG. 16 illustrates a conceptual diagram of division of the past part information (pedestrian part region). F101 indicates a pedestrian, and J101 indicates a brightly imaged pedestrian part region detected in the luminance analysis processing (R304) and stored in the texture storage processing (R305). In the multi-part scanning processing (R307A), the pedestrian part region of J101 is divided into a plurality of pedestrian part regions as indicated by T301. In the division method, the part region on the image may be divided according to the size, or may be cut out small in the vertical direction by one pixel. In the multi-part scanning processing (R307A), raster scanning is performed on the current frame using a plurality of pedestrian part regions (divided pedestrian part regions) indicated by T301 as a template. By obtaining peak values for the correlation values of the plurality of templates, the similar part region in the current frame and the past frame is specified, and the similar part region in the current frame is detected. When the template is scanned, the size of the template is changed and raster scanning is performed.

In the part information updating processing (R307B), the image information of the similar part region in the past frame and the current frame specified in the multi-part scanning processing (R307A) is stored and updated.

In the distance estimation processing (R308), the distance to the pedestrian is calculated on the basis of the relationship between the part region and the height from the road surface in the entire pedestrian region calculated in the pedestrian height calculation processing (R306) and the part region information detected in the multi-part scanning processing (R307A). First, height information of the pedestrian part region from the road surface in the current frame specified in the multi-part scanning processing (R307A) is acquired. Specifically, where the part region detected in the current frame corresponds in the entire pedestrian region is obtained, and the height information from the road surface of the part region specified in the current frame is acquired by referring to the relationship between the part region and the height from the road surface calculated in the pedestrian height calculation processing (R306). Next, the distance to the pedestrian is estimated from the height of the part region detected in the current frame from the road surface, the position of the part region on the image estimated in the multi-part scanning processing (R307A), and the installation position and angle information of the camera.

(Operational effects) From the above, the object recognition device 3 of the present embodiment estimates the distance to the pedestrian using the part region common in the past frame and the current frame for each frame in the non-overlapping region. Since different parts of a pedestrian or the like illuminated by a headlight at night are irradiated with light as the vehicle moves, the appearance of the same part changes for each frame. Therefore, there is a possibility that it is always difficult to detect the same portion, but by performing detection using part information (similar part region) having similar appearance in the past frame and the current frame, it is possible to stably detect even in a case where the appearance of the part temporally changes, and to accurately estimate the distance from the own vehicle to an object such as a pedestrian.

Note that, in the above-described embodiment, a monocular camera is assumed as a target sensor in the sensor information acquisition unit, but the present invention is also applicable to a stereo camera, a millimeter wave, a laser radar, and the like. In addition, although the embodiments described above have been described on the assumption that the sensor information acquisition unit or the image acquisition unit senses the front of the vehicle, the present invention is not limited to the front, and can also be applied to the rear or the side.

Although the present invention has been described with reference to the first embodiment, the second embodiment, and the third embodiment, the present invention is not limited to the above-described embodiments, and includes various modifications that can be understood by the parties within the scope of the present invention. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing by an integrated circuit. Each of the above configurations, functions, and the like may be achieved by software by a processor interpreting and executing a program that achieves each function. Information such as a program, a table, and a file for achieving each function can be stored in a memory device such as a memory, a hard disk, or a solid-state drive (SSD), or a recording medium such as an integrated circuit (IC) card, a secure digital (SD) card, or a digital versatile disc (DVD).

In addition, only control lines and information lines considered to be necessary for explanation are illustrated, but not all the control lines and the information lines for a product are illustrated. In practice, almost all the configurations may be considered to be connected to each other.

REFERENCE SIGNS LIST 1 object recognition device (first embodiment)
2 object recognition device (second embodiment)
3 object recognition device (third embodiment)
100, 200, 300 sensor information acquisition unit
101, 201, 301 image acquisition unit
102, 202, 302 distance information acquisition unit
103, 203, 303 overlapping region object detection unit
104, 204, 304 part specification unit
105, 205, 305 image information storage unit
106, 206, 306 three-dimensional information acquisition unit
107, 207, 307 non-overlapping region object detection unit
108, 208, 308 distance calculation unit
209 road surface estimation unit
309 time-series similar part specification unit

The invention claimed is:
1. An object recognition device comprising:
a sensor information acquisition unit that acquires sensor information obtained by sensing a periphery;
an image acquisition unit that acquires an image obtained by capturing an image of a periphery;
a distance information acquisition unit that acquires distance information with respect to an overlapping region where sensing regions of the sensor information acquisition unit and the image acquisition unit overlap;
an overlapping region object detection unit that detects an object from the overlapping region on a basis of the distance information acquired by the distance information acquisition unit;
a part specification unit that determines a specific part region in the object by analyzing an image of a region corresponding to the object detected by the overlapping region object detection unit;
an image information storage unit that stores image information regarding a part region determined by the part specification unit;
a three-dimensional information acquisition unit that acquires three-dimensional information of a part region specified by the part specification unit on a basis of the distance information acquired by the distance information acquisition unit;

a non-overlapping region object detection unit that refers to the image information stored in the image information storage unit with respect to a non-overlapping region where sensing regions of the sensor information acquisition unit and the image acquisition unit do not overlap, and detects a similar part region having a part region specified by the part specification unit or a part of a part region specified by the part specification unit; and a distance calculation unit that calculates a distance to an object including the part region or the similar part region on a basis of detection region information on the image of the part region or the similar part region detected by the non-overlapping region object detection unit and the three-dimensional information acquired by the three-dimensional information acquisition unit.

2. The object recognition device according to claim 1, wherein the three-dimensional information acquired by the three-dimensional information acquisition unit is a height of the part region determined by the part specification unit from a road surface.

3. The object recognition device according to claim 2, further comprising:

a road surface estimation unit that estimates a shape of a road surface based on the distance information acquired by the distance information acquisition unit, wherein the distance calculation unit calculates a distance to an object including the part region or the similar part region on a basis of detection region information on an image of the part region or the similar part region detected by the non-overlapping region object detection unit, three-dimensional information acquired by the three-dimensional information acquisition unit, and road surface shape information estimated by the road surface estimation unit.

4. The object recognition device according to claim 1, wherein the three-dimensional information acquired by the three-dimensional information acquisition unit is an actual size of a height or a width of the part region determined by the part specification unit.

5. The object recognition device according to claim 1, wherein the part specification unit analyzes a luminance value of an image, and determines the part region on a basis of a contrast change of brightness and darkness.

6. The object recognition device according to claim 1, further comprising:

a time-series similar part specification unit that determines the similar part region having a similar appearance in a current frame to a part region of a past frame stored in the image information storage unit, wherein the image information storage unit stores image information of the similar part region determined by the time-series similar part specification unit.

7. The object recognition device according to claim 6, wherein the time-series similar part specification unit divides a part region of a past frame stored in the image information storage unit into a plurality of part regions, and determines the similar part region corresponding to the divided part region in a current frame.

* * * * *